(12) United States Patent
Sinnette et al.

(10) Patent No.: US 7,524,093 B2
(45) Date of Patent: Apr. 28, 2009

(54) DISPLAYING IMAGE MECHANISM WHEEL ASSEMBLY

(76) Inventors: Ronald Sinnette, 2121 Hepburn #204, Houston, TX (US) 77054; Patrick Massie, 10512 Dry Valley Ct., Fort Worth, TX (US) 76108

( * ) Notice: Subject to any disclaimer, the term of this patent is extended or adjusted under 35 U.S.C. 154(b) by 395 days.

(21) Appl. No.: 11/303,099

(22) Filed: Dec. 16, 2005

(65) Prior Publication Data

US 2007/0137078 A1    Jun. 21, 2007

(51) Int. Cl.
*B60Q 1/00*    (2006.01)
*F21V 4/00*    (2006.01)
*F21V 7/04*    (2006.01)
*F21L 13/00*   (2006.01)
*B60B 7/04*    (2006.01)

(52) U.S. Cl. .................. 362/500; 362/158; 362/192; 362/549; 301/37.25

(58) Field of Classification Search .............. 362/500, 362/192, 193, 526, 158, 384, 386, 103, 267, 362/549, 183, 42, 487, 806; 301/37.108, 301/37.109, 108.2, 109, 37.104, 37.25, 35.51; 310/73, 75 C, 103, 23, 24, 20, 15, 36, 37; 40/606.02

See application file for complete search history.

(56) References Cited

U.S. PATENT DOCUMENTS

| | | | | |
|---|---|---|---|---|
| 4,725,928 | A * | 2/1988 | Strepek | 362/485 |
| 6,443,530 | B1 * | 9/2002 | Lee | 301/37.25 |
| 6,536,848 | B1 * | 3/2003 | Goodman | 301/37.25 |
| 6,926,369 | B2 * | 8/2005 | McCaster et al. | 301/37.25 |
| 7,048,421 | B1 * | 5/2006 | Allen-Atkins | 362/500 |
| 2003/0165063 | A1 * | 9/2003 | Liaw | 362/500 |
| 2006/0163960 | A1 * | 7/2006 | Cheng et al. | 310/73 |

* cited by examiner

*Primary Examiner*—Jong-Suk (James) Lee
*Assistant Examiner*—David R Crowe
(74) *Attorney, Agent, or Firm*—Delphine James

(57) ABSTRACT

The apparatus of the present invention is a customized non-rotatable decorative displaying image mechanism wheel assembly. The wheel assembly comprises a wheel mount supportable by of the wheel of a vehicle. A protective cover is affixed to the wheel mount to form a housing with an interior cavity therein. The display holder can be transparent or translucent with any image, logo, emblem, insignia or hologram covering affixed thereto. A display holder and member is positioned behind the protective covering within the cavity of the housing. The display holder is bolted with predefined weighted members and ball bearings such that the display holder and member remain stationary during within the interior cavity as the vehicle's wheel turns. Alternatively, predefined weighted members may not be used for certain design, since shaft members may stabilize image. The display member can be illuminated by a light source which is powered by an electromechanical power source utilizing the Faraday Effect. Alternative, the display holder can support an electronic display device which is powered by batteries. The electronic circuitry component creates an Illuminating Circuit when the electromechanical power source using Faraday's Effect is fixed to electrical components. The electromechanical power source and/or batteries of the Illuminating Circuit supply energy to all electrical components. When rechargeable batteries are used the magnetically induced conductive coils provide energy to recharge batteries. The electromechanical power source utilizes a drag tube or gearbox configuration to produce energy using the Faraday Effect. Alternatively, electronic circuitry component will select either the electromechanical power source or battery to illuminate light source. Alternatively, a remote control will extinguish any light source on any display member.

23 Claims, 9 Drawing Sheets

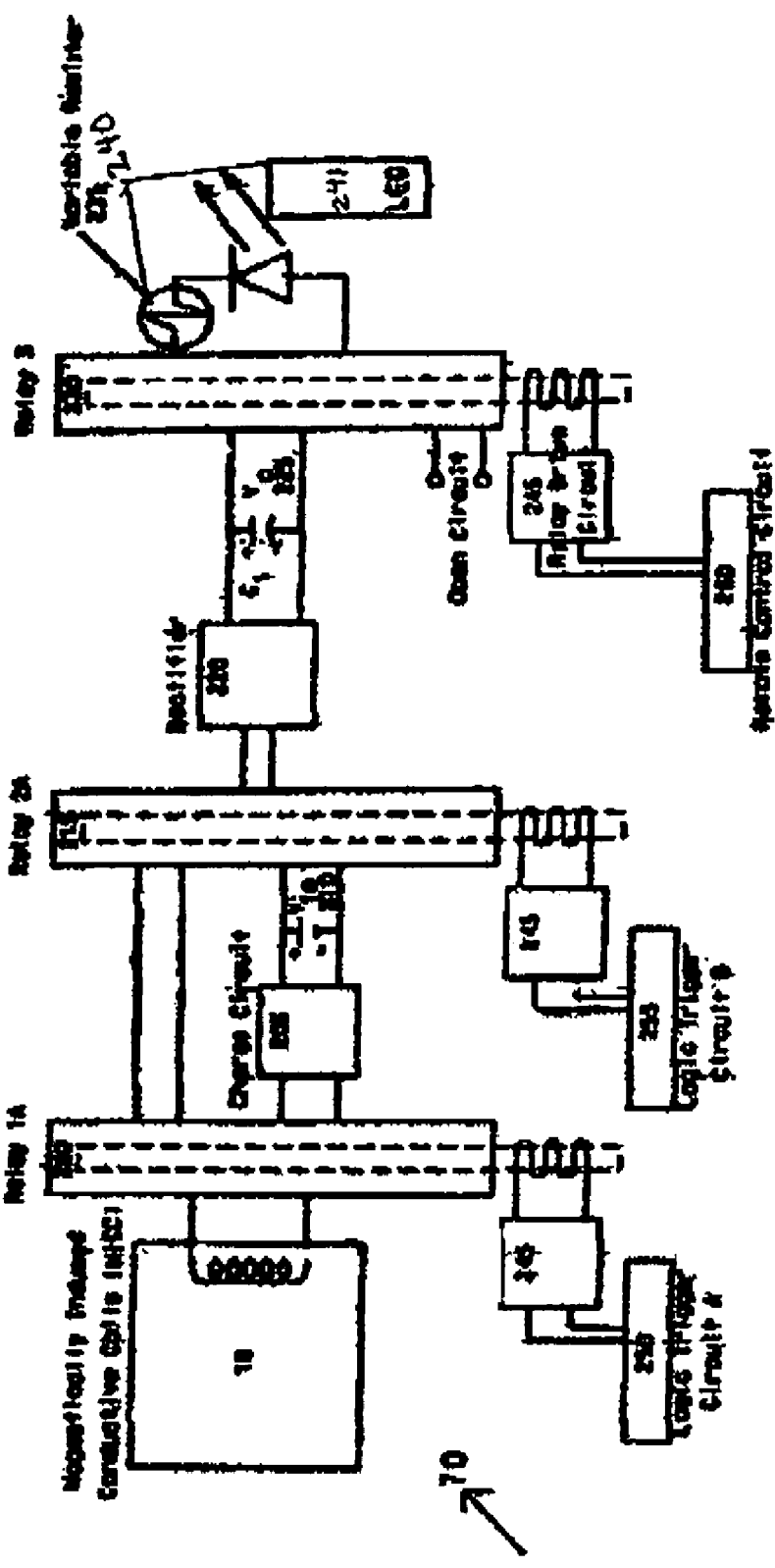
Figure 6A : Illuminating Circuit with Charge Circuit for Battery

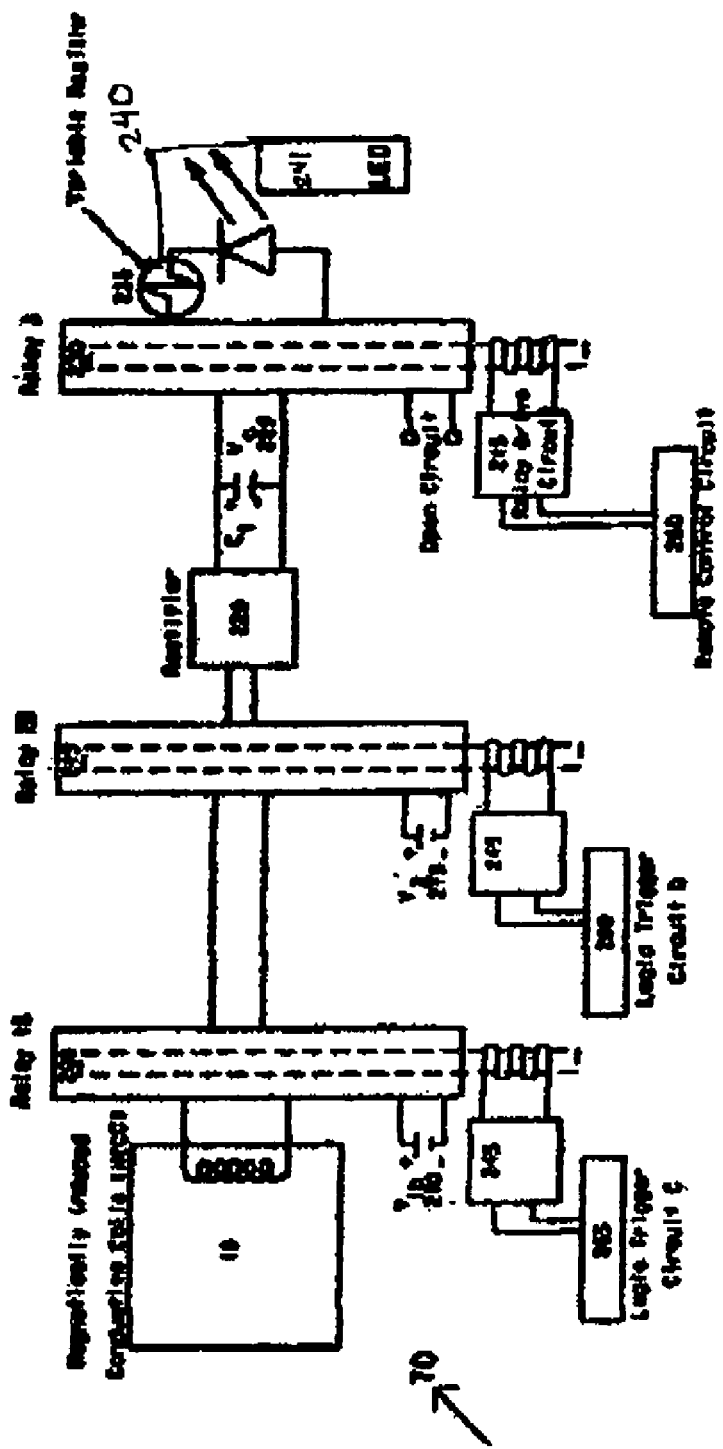
Figure 6B : Illuminating Circuit with NO-Charging Circuit for Batteries, but two battery sources and one MICC.

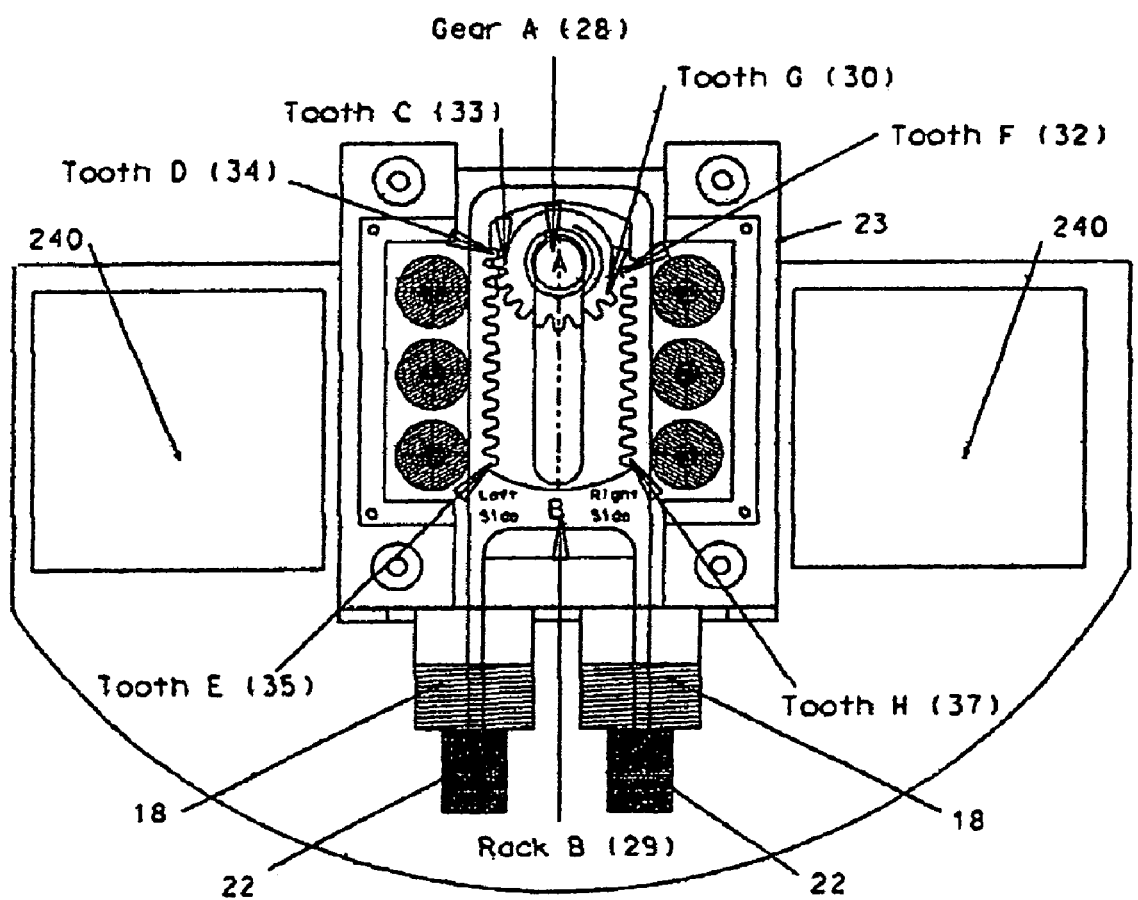
FIGURE 7 (81)

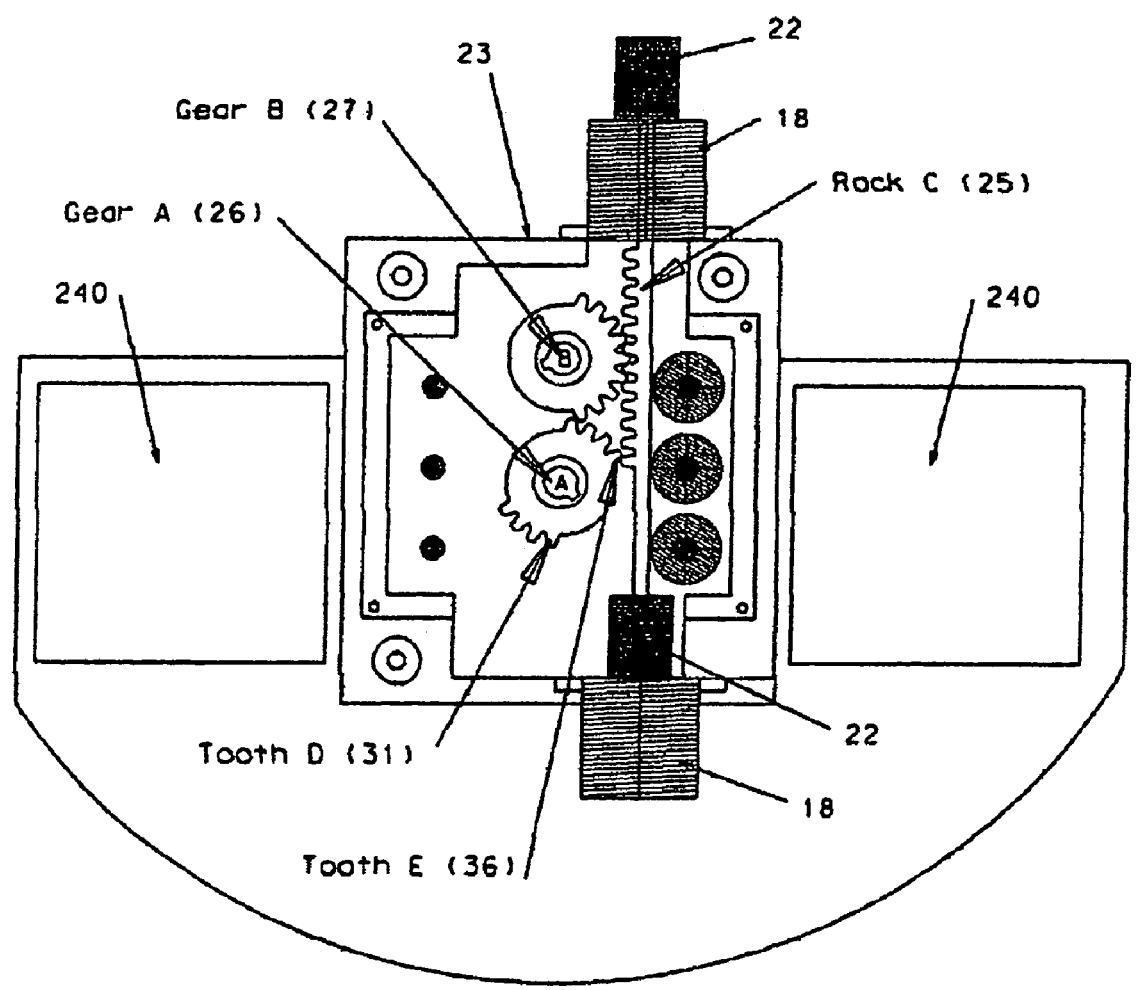
FIGURE 8 (82)

DISPLAYING IMAGE MECHANISM WHEEL ASSEMBLY

BACKGROUND

The present invention relates to non-rotatable decorative rims for wheels of vehicles. More particularly, the present invention relates to displaying images on a non-rotatable decorative mechanism for the wheels of any type of vehicle.

Stationary wheel covers or hub caps are known in the prior art. Various devices have been developed to be mounted on the wheels of a vehicle. For example, U.S. Pat. No. 6,471,302 to Romijn shows a hub cap with a picture for a rim of a wheel of a vehicle comprises a housing connected to the rim connected rotatable to the housing, U.S. Pat. No. 3,810,679 to Myers shows a non-rotatable hub and means for sealing the non-rotatable hub to exclude dust and the like, U.S. Pat. No. 4,981,329 to Koch, et al., shows a stationary wheel cover assembly for a motor vehicle is provided and consists of a mounting flange affixed to the threaded end of a spindle in the motor vehicle. A cover plate having indicia carried on the outer surface is secured to the mounting flange so that when a wheel rim with a tire connected to a hub on the spindle rotates the cover plate will be stationary allowing the indicia to be viewed and U.S. Pat. No. 4,280,293 to Kovalenko et al., shows a stationary display member which is mounted on the rotating hub cap of a wheel of a vehicle, comprising of a disc-like member coaxially mounted on the hub cap to be freely rotatable about the axis of rotation of the hub cap. An appropriate insignia, design, message or other inscription is imprinted or attached to the outer face of the disc-like member which remains stationary as the hub cap rotates.

Magnetism has been around since the ancient times. There have been many scientific discoveries since the late $18^{th}$ and $19^{th}$ centuries. Today several countries including Japan, Germany, and the United States have utilized the theory of magnetism to implement high speed magnetic levitation trains in which the ground transportation vehicle is levitated above a track and propelled by magnetic fields. Other technological advancements of magnets involves the electric generator which occurs when a conductor, such as wire, passes through a magnetic field resulting in the negatively charged electrons in the wire experiencing a force along the length of the wire that accumulate at one end of it leaving positively charged atomic nuclei, partially stripped of electron, at the other end. This creates a potential difference, or voltage, between the ends of the wire. If the ends of the wire are connected by a conductor, a current will flow around the circuit. This is the principle behind the rotary electric power generator, in which a loop of wire is spun through a magnetic field so as to produce a voltage and generate current. Hence, induction is the creation of a current in a conductor moving across a magnetic field. The theory of induction is utilized in the present invention to provide electricity to the displaying image mechanism on the wheel of a vehicle.

SUMMARY

The apparatus of the present invention is a customized non-rotatable decorative wheel assembly. The mechanical aspects of this patent are based on discoveries of Isaac Newton's first, second, and third laws of physics. These laws allow me to analyze the mechanical design affects of friction force, magnet force (attraction and repelling), ball bearings, and gears. The wheel assembly comprises a wheel mount supportable by the wheel of a vehicle via mounting bolts. A protective cover is affixed to the wheel mount to form a housing with an interior cavity therein. Positioned behind the protective covering is the display holder which contains the insignia logo, emblem, or hologram affixed thereto. The display holder has weighted bolts and is designed such that the lower half of the display holder weighs more than the upper half. This difference in weight, in conjunction with the ball bearings allows the display holder to remain stationary within the interior cavity of the wheel mount as the vehicle's wheel turns. The potential energy that exists within the wheel transforms into kinetic energy once the wheel begins to rotate creating electricity by way of magnetic generation. The display holder can be operationally connected to a light source which is powered by magnetic generation. Additionally, the display holder can support an electronic display device which is also powered by magnetic generation.

The power source used to power a light and electronic display device generates energy by the Faraday Effect producing electricity for the electrical components of the displaying image mechanism wheel assembly. This design is based on the Faraday Effect. The configuration of Faraday's Effect to electrical components will now be referred to as the Illuminating Circuit. The Illuminating Circuit can be powered by batteries and/or magnetically induced conductive coils. The Illuminating Circuit supplies energy to all electrical components that need power. When rechargeable batteries are used the magnetically induced conductive coils provide energy to recharge batteries. The Faraday Effect portion of the Illuminating Circuit can have two alternative embodiments. The first embodiment consists of a drag tube design. The second embodiment consists of a gear box design.

BRIEF DESCRIPTION OF DRAWINGS

The drawings and the accompanying descriptions illustrate the present invention.

FIG. 6A represents a schematic diagram of the electronic circuitry component or Illuminating Circuit.

FIG. 6B represents a schematic diagram of an alternative embodiment for the Illuminating Circuit.

FIG. 7 is a front view of the embodiment of the present invention, the interface of gears within gearbox (82).

FIG. 8 is a front view of the alternative embodiment of the present invention, the interface of gears within gearbox (81).

DETAILED SPECIFICATION

Figure 1:
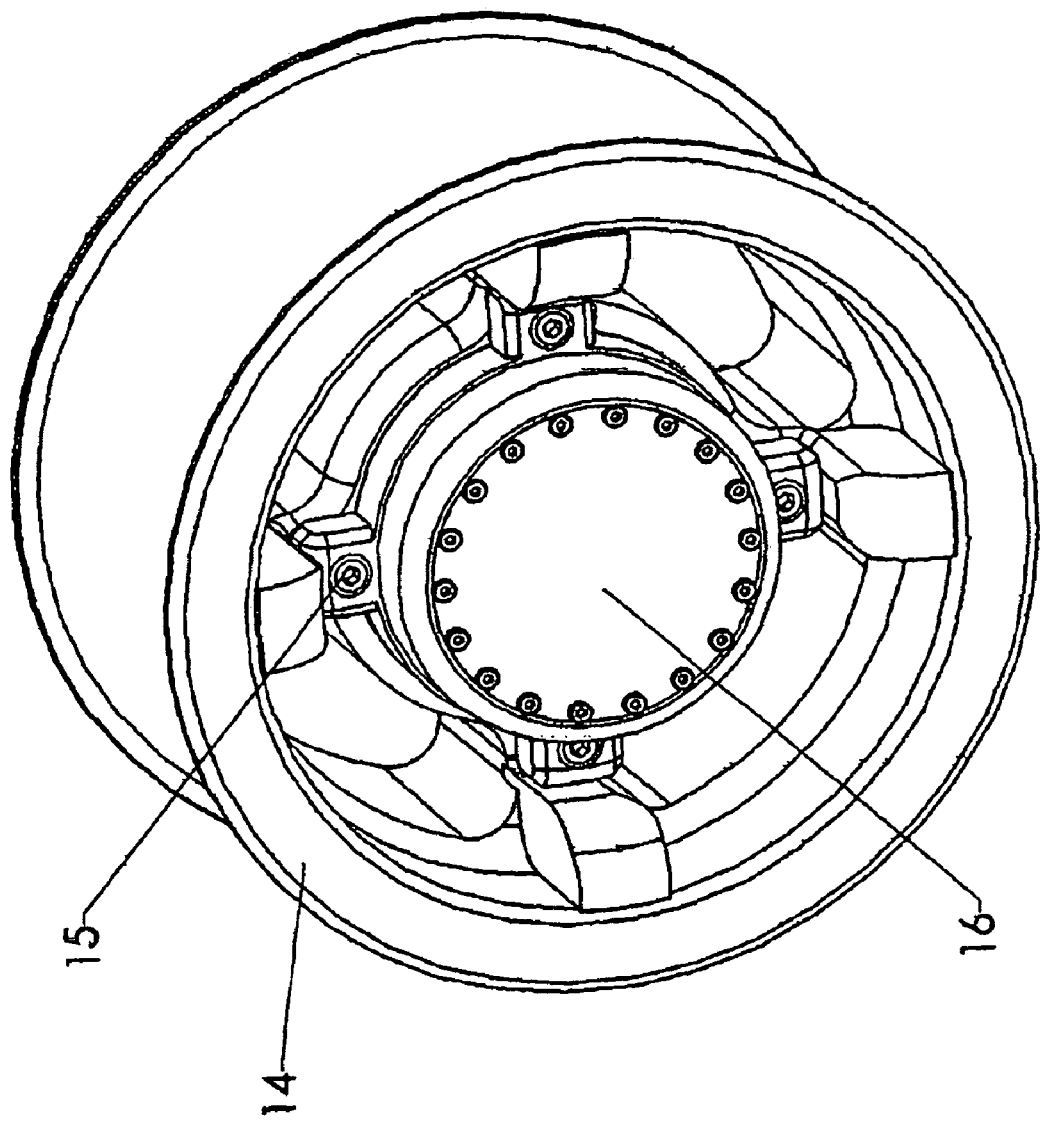
FIG. 1 is an exterior frontal view of the embodiments' for the present invention with a decorative non-rotatable displaying image mechanism installed on the wheel of a vehicle.

Referring to FIG. 1, there is shown a perspective view of the hermetically sealed displaying image mechanism wheel assembly (16) in accordance with the present invention. As shown, the displaying image mechanism wheel assembly (16) is mountable, as described in further detail below, onto a wheel (14) of a vehicle. The displaying image mechanism (16) wheel assembly of the present invention is not limited to self-propelled vehicles. Hauling transportation equipment such as semi-trailer boat-carrying trailer, etc. can equally benefit from the displaying image mechanism (16) of the present invention. Additionally, the displaying image mechanism wheel assembly (16) can be designed to fit any type of wheel of a vehicle.

Figure 2:
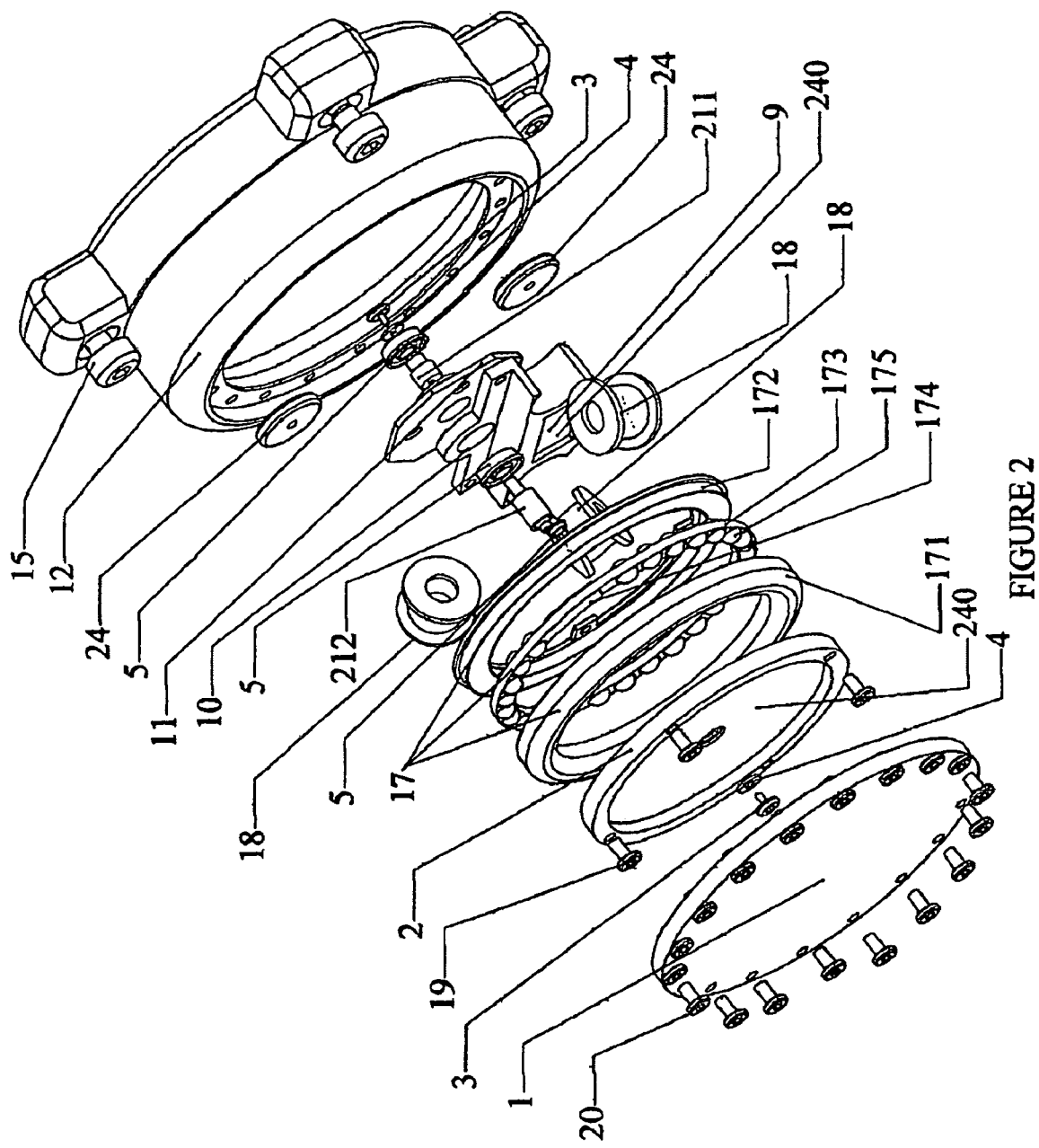
FIG. 2 is an exploded view of the first embodiment of the present invention, the drag tube design.

FIG. 2 illustrates an exploded view of the present invention. The displaying image mechanism wheel assembly (16) further comprises a wheel mount (12) affixed to the wheel (14) by a plurality of suitably fasteners (15) such as conventional wheel mounting. The displaying image mechanism wheel assembly (16) further includes a protective cover (1) which when affixed to wheel mount (12) creates a hermitically sealed interior cavity therein thereby preventing debris or water from entering the interior cavity. Mounted to the wheel mount (12) within the interior cavity is display holder (2) for displaying a logo, insignia, emblem, or hologram affixed thereto. In the illustrated embodiment, display holder (2) is weighted and configured with stationary means. As shown, the stationary means can be ball bearings (5) mounted at the center of display holder (2) to prevent the it from rotating. Display holder (2) is operationally associated with an electromechanical power source assembly (17) which is electrically connected to a light source network (240) shown in FIGS. 6A and 6B. The electromechanical power source assembly (17) generates electricity utilizing the faraday effect. The generated electricity is delivered to the light source network (240) which illuminates an image incorporated on the display holder (2).

Protective cover (1) is preferably made of a transparent or translucent material such as plastic, acrylic, non-shattering glass or another suitable material. Additionally, the transparent or translucent material can also be made of various colors. The transparency of the protective cover (1) allows for the image on display holder (2) to be viewed as the wheel (14) rotates. In alternative embodiments protective cover (1) can be made of convex or concave lens which provides magnification of the image on display holder (2). Additionally, the display holder (2) can also be made of a transparent or translucent material such as plastic, acrylic or glass, and the transparent or translucent material can also be made of various colors.

Figure 3:
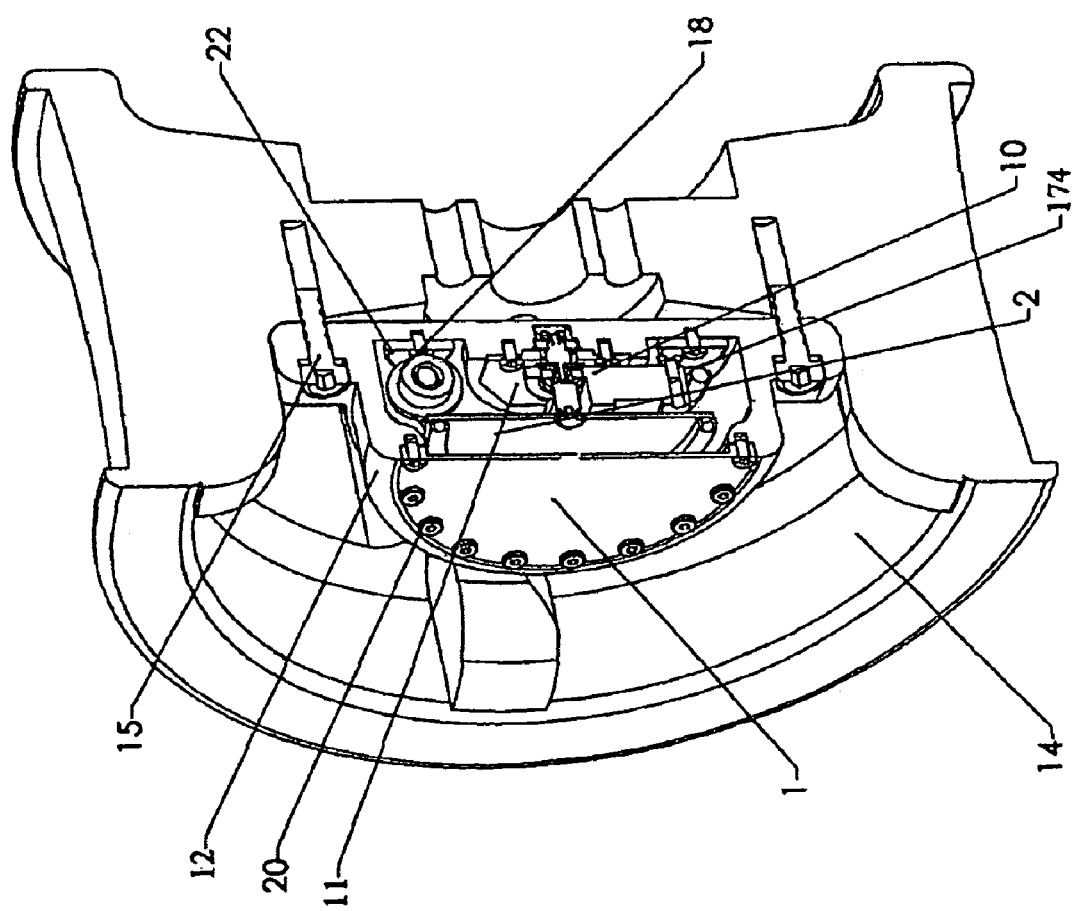
FIG. 3 is a cross-sectional view of the first embodiment of the present invention, the drag tube design.

FIG. 3 illustrates a cross-sectional view of the present invention, the drag tube assembly (17) design, wherein each component of the assembly is shown. Referring to FIGS. 2 and 3, the drag tube assembly (17) is fixably mounted to weighted plate (10) within the interior cavity. The drag tube assembly (17) has an annular shape tube with an interior conduit therein. The interior conduit is configured to receive an annular shape cage (173) which is adapted to house a plurality of ball bearing 174 and magnets 175 of greater than 0.1 telsa. To render the drag tube assembly stationary, the center of gravity of the weighted plate (10) is predetermined to ensure that the mass of the weighted plate (10) is greater than the friction of the assembled drag tube components (cage (173), bearing (174), and magnets (175)). The drag tube cage (173) further comprises a plurality of recesses dimensioned to receive bearings (174) and magnets (175). By way of illustration, the weighted plate (10) is not limited to but is semi-circular in shape and aligned to the lower half of the drag tub assembly (17). The conductive wire coils (18) are made of a material of greater than 1 seimen per meter and configured into a hollow cylindrical shape with the internal diameter or chamber large enough to surround the drag tube assembly (17).

The present invention can further includes a plurality of conductive coil 18. Each conductive coils (18) are operationally connected to the illuminating Circuit (70) shown in FIGS. 6A and 6B. The Illuminating Circuit (70) can be mounted to the weighted plate (10).

The present invention further comprises segmented bearing pin which comprises first section 211 and second section 212. The segmented bearing pin (211 and 212) supports the coaxial mounting of the display holder (2) and weighted plate (10) to the wheel mount. First section 211 is coaxially mounted behind drag tube assembly (17) and in front of weighted plate (10) and interconnects ball bearing 5 to weight plate (10). Second section 212 is coaxillay mounted behind weighted plate mount bracket and interconnects weighted plate (10) to the wheel mount. When the segmented pin is fully assembled into this configuration, the drag tube assembly (17) and display holder (2) are rendered stationary while the wheel (14) is rotating. Magnets (24) of greater than 0.1 Telsa are fixed to the inner wall of wheel mount (12) and rotate as wheel (14) rotates. The magnets (24) are linked to drag tube magnets (175) via magnetic polarity. This magnetic polarity forces cage (173) to rotate within the interior conduit of the drag tube assembly (17) thereby dragging magnets (175). A voltage and current is produced as the drag tube magnets (175) pass within the inner chamber of the conductive coils (18), which are located around the drag tube assembly (17).

Illuminating electronic circuit component (70) is electrically coupled to conductive coils (18) allowing the transfer of the generated voltage and current into illuminating electronic circuit component (70) which supplies power to the light source network (240) which can be implemented within the area designated as (9) in FIG. 2. In FIG. 6A, main battery ($V_{1A}$) (210) is used as primary source of power for charging $C_1$ (225) that supplies power to the Light Source Network (240). In FIG. 6B, main battery ($V_{1B}$) (270) is used as the primary source of power for charging $C_1$ (225) that supplies power to the Light Source Network (240). However, backup battery ($V_2$) 275 can be used to charge capacitor $C_1$ (225) whenever main battery (270) and capacitor (225) falls below a specified voltage. In FIGS. 6A and 6B, whenever main battery (210), main battery (270), or backup battery (275) falls below a predetermined voltage level, conductive coils (18) can directly power capacitor $C_1$ (225) via Relays (200) and (215). Capacitor ($C_1$) (225) is charged through a connected half-wave rectifier (220) or Bridge Rectifier network (220). Illuminating circuit (70) further described below supplies energy to capacitor (225) through several alternative leg currents selected by a particular relay connection pattern within a relay network. Digital logic connected to each relay within the network is the means utilized to select which alternative leg of current will supply power to the capacitor (225) based upon the strength of the voltage level in the available alternative legs of current.

Conductive coils (18) (shown in FIG. 2) supply energy that allows charge circuit (205) to recharge battery (210). Conductive coils (18) also supply energy needed to charge capacitor network C1 225 that supplies power to Light Source Network (240). Illuminating Circuit (70) supplies energy necessary to charge $C_1$ (225) through a bridge diode network (220). The bridge diode network (220) performs as a full-wave or half-wave rectifier allowing current to flow only in one direction to $C_1$, the charge capacitor (225). When $C_1$ (225) is charged sufficiently, it supplies power to Light Source Network (240). Relay Network (200 and/or 215) acts as a switch allowing magnetically induced conductive coils (18) (shown in FIG. 2) to charge either (225) $C_1$ (225) or battery (210) ($V_{1A}$) when using a rechargeable main battery (210).

In FIG. 6A, when battery (210) is not available conductive coils (18) charge capacitor (225) and/or battery (210). In FIG. 6B, when main battery (270) is not available, conductive coils

(18) or backup battery ($V_2$) (275) charge capacitor $C_1$ (225). If battery $V_{1A}$'s (210) voltage level drops below a specified level, relays (200 and 215) allow a conductive coil (18) to charge $V_{1A}$ (210) through a diode (205). The diode (205) will prevent $V_{1A}$ (210) from discharging in stationary conductive coil (18).

Figure 4:
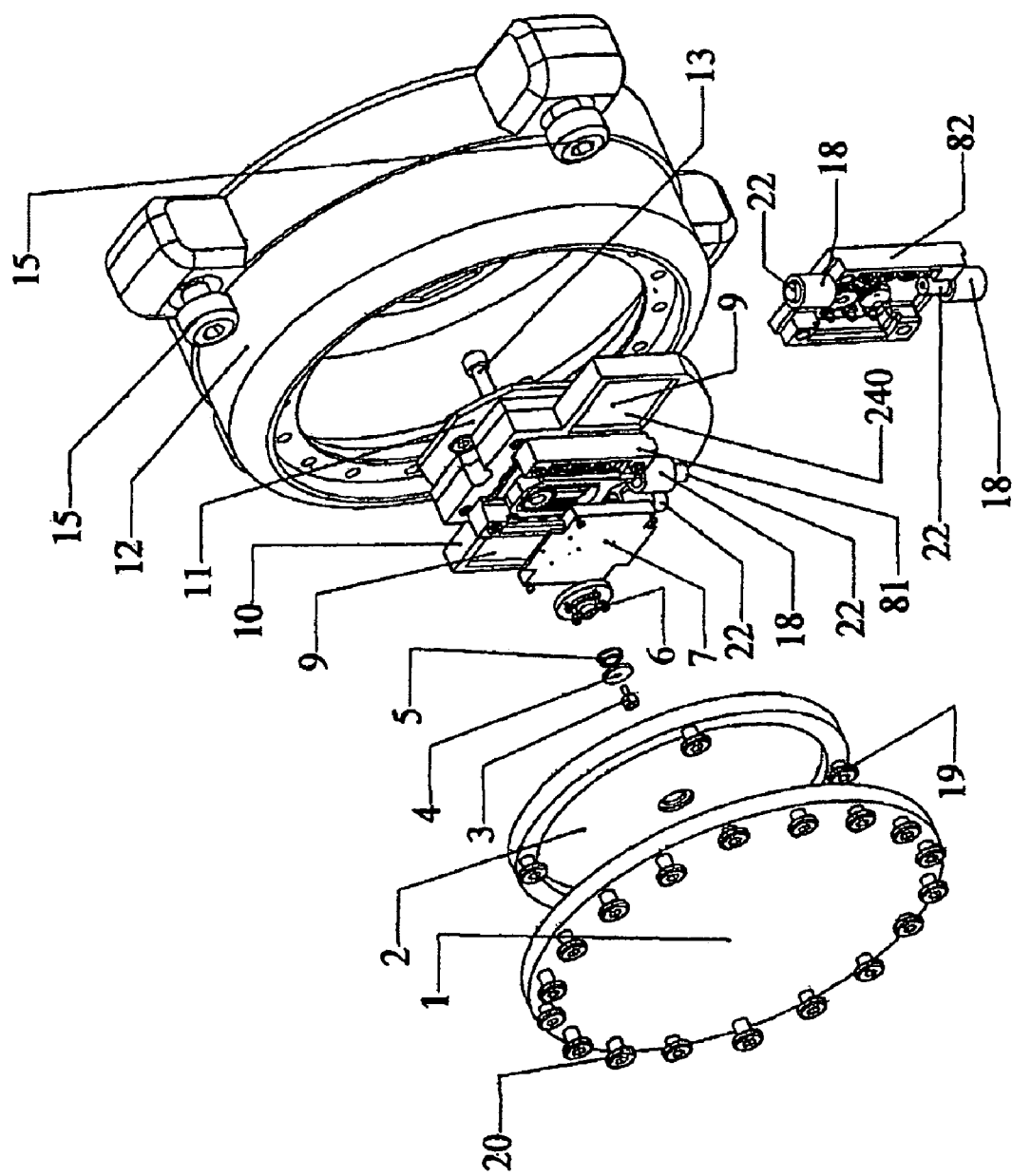
FIG. 4 is an exploded view of the second embodiment of the present invention, the gear box design

The Light Source Network (240) is a resistive (235) and Light Emitting Diode (LED) circuit 241. The Light Source Network (240) is powered by $V_{1A}$ (210), $V_{1B}$ (270), $V_2$ (275), or capacitor $C_1$ (225). As shown in FIG. 2 and FIG. 4, the display holder (2) can be a lens and/or reflective surface that's contained within the protective covering (1) and wheel mount (12) to intensify the LED's light beam. The Light Source Network (240) can supply light energy to display holder (2) for illuminating custom letters and/or words. The Light Source Network (240) can be mounted on weight plate (10) or display holder (2).

The Light Source Network (240) can be configured to establish a capacitance and resistance time constant less than eight minutes. The time constant is a means of automatically distinguishing the LED and allowing conductive coils (18) enough time to transfer enough power to charge $V_{1A}$ (210) In an alternative embodiment, remote control (260) can be used to extinguish all Light Source Network (240) on each rim simultaneously.

Relays (200 and 215) allow the conductive coils (18) to replace $V_{1A}$ (210) as the power source for charging capacitor (225). Each relay (200, 215, and 230) is a switching circuit that is triggered by transistor circuit (245) that becomes active depending on the acceleration/deceleration of a vehicle, remote control (260) output voltage $V_r$, and the voltage levels of $C_1$ (225), $V_{1A}$ (210), $V_{1B}$ (270), and $V_2$ (275). If the acceleration/deceleration magnitude, $V_{1A}$ (210) voltage level, $V_{1B}$ (270) voltage level, $V_2$ (275) voltage level, $V_r$ voltage level, and $C_1$ (225) voltage level are above a set of predetermined values, the Relays (200, 215, and 230) can be forced in allowing the conductive coils (18) to continue charging $C_1$ (225) and capacitor $C_1$ continues to supply power to Light Source Network (240).

When the vehicle is motionless, the Light Source Network (240) can be operating solely by energy from $C_1$ (225). The rim's text remains illuminated until the Light Source Network (240) sufficiently dissipates the energy from $C_1$ (225). $C_1$ (225) is allowed to dissipate energy continuously through Light Source Network (240) or Relay 3 (230) switches to an open circuit to extinguish Light Source Network (240).

FIG. 6A illustrates three switching relays, that are identified as Relay 1A (200), Relay 2A (215), and Relay 3 (230). The magnetically induced conductive coils (18) are connected to relay (200). Situated between relay (200) and relay (215) is a diode charge circuit connected to battery shown in FIG. 6A. Each relay has a connected Transistor (245) which is connected to a monitoring digital logic circuit (250, 255, and/or 260). Transistor (245) energizes Relay 1A (200), 2A (215) or 3 (230) when stimulated by digital logic (250, 255, and/or 260). Also a decoder (260) or "Counter circuit (260) can be designed for one count" energizing Relay 3 (230). Digital logic (250, 255, and/or 260) monitors acceleration/deceleration magnitude (ADM) of the vehicle, $V_{1A}$ (210) voltage level, and $C_1$ (225) voltage level to trigger certain relay (200, 215, and 230) events. Digital logic (250, 255, and/or 260) will determine permutations and combinations needed to trigger relays.

FIG. 6B illustrates an alternative Relay Network having three switching relays identified as relay 1B (200), relay 2B (215), and relay 3 (230). Magnetically induced conductive coils (18) and battery $V_{1B}$ (270) are inputs to relay 1B (210). The output of Relay 1B (200) and $V_2$ (275) inputs of Relay 2B (215). In this configuration, there is no charging circuit for batteries. However, the output of Relay 2B (215) and the remaining components of the circuit are the same as in FIG. 6A. TTL or CMOS logic (265, 280, and 260) determines permutations and combinations needed to trigger relays.

The Remote Control circuit (260) allows users to extinguish each illuminated Light Source Network (240) on each vehicle rim simultaneously. The Remote Control circuit (260) can comprise an encoder, decoder, antennas, receiver, and transmitter. The receiver, an antenna, and decoder (260) are electrically connected to Relay Drive circuit (245) that triggers Relay 3 (230). However, the transmitter, an antenna, and encoder (260) are located in a hermitically sealed case with push button activation. For each installation, all decoders and encoders will be set at the same frequency, so the remote control (260) can simultaneously extinguish each Light Source Network (240) mounted within each displaying image mechanism wheel (16). The receiver and transmitter can be either Radio Frequency (RF) or Infrared signals. Open circuit (202) provides the capability of simultaneously extinguishing the Light Source Network (240). Capacitor $C_1$ (225) can discharge all its energy in the Light Source (240) on each wheel in a specified time constant.

Figure 5:
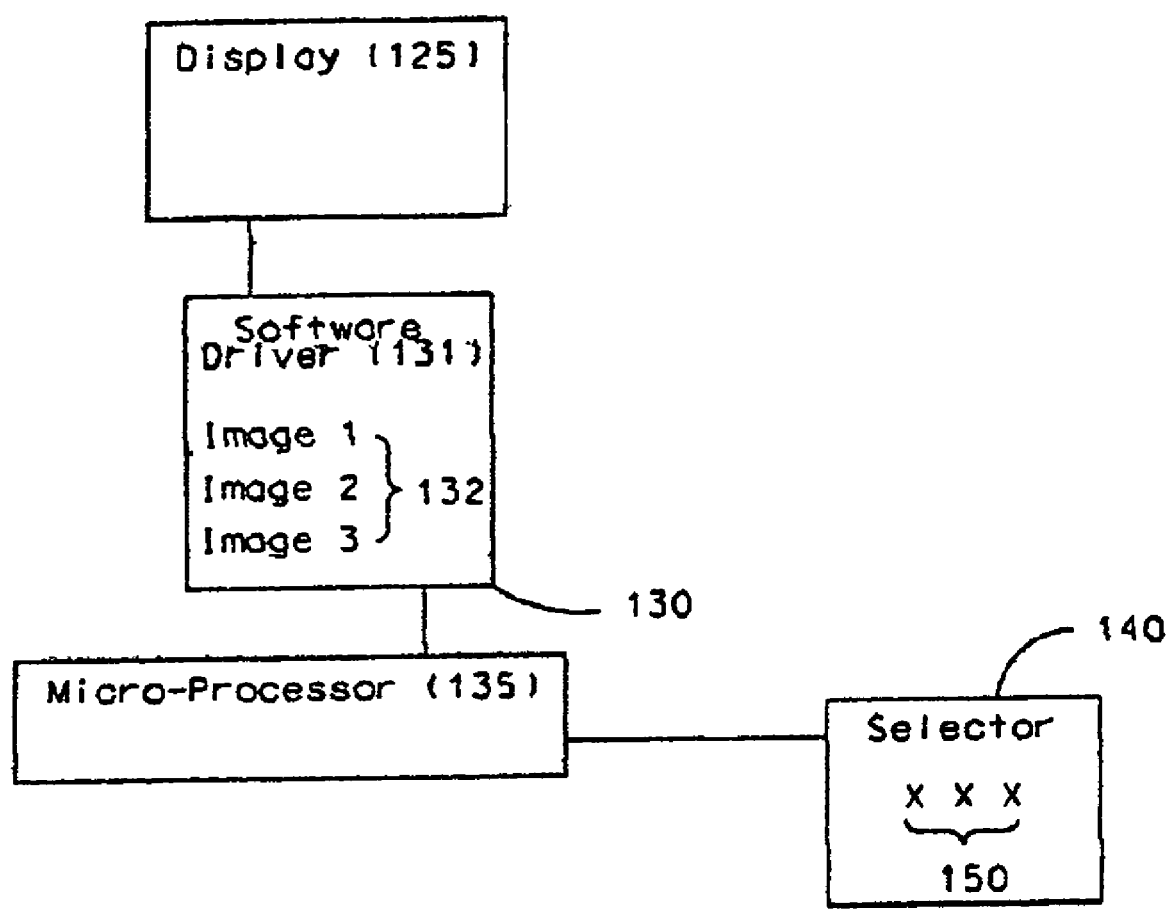
FIG. 5 is an alternative LCD design for the display holder.

Referring to FIG. 5, in some embodiments of the present invention a light source can be operationally connected to the display holder (2). Light source illuminates the inscribed logo, emblem, insignia or hologram. Additionally, light source can be a white or colored light bulb or another suitable light source. In some embodiments, the logo, emblem, insignia or the hologram can be inscribed into the display holder (2) utilizing LED's of various colors or another suitable means. Light source power is provided by Illuminating Circuit 70 shown in FIGS. 6A and 6B. Illuminating Circuit 70 can be direct current batteries and/or magnetically induced conductive coils (18). The Illuminating Circuit 70 supplies energy to all electrical components that need power. When rechargeable batteries are used the magnetically induced conductive coils (18) provide energy to recharge batteries.

In alternative embodiments, display holder (2) can include a small electronic computing device which displays a graphic image. The small electronic computing device includes a memory (130) and a flat panel display (125) such as a LCD or another suitable graphic display. The flat panel display (125) and memory (130) are coupled to a microprocessor (135). The memory (130) contains the graphic image (132) as well as the software driver (131) required to display graphic image (132) onto the flat panel display (125). As the wheel rotates, faraday's circuit (FIG. 6A/6B) provides an electrical current which is operationally coupled to the microprocessor (135). The microprocessor (135) executes the software driver (131) which displays the graphic image (132) onto the flat panel display (125).

In other embodiments, the memory (130) can contain a plurality of graphic images (132) with a selector mechanism (140) for displaying each alternative graphical image. Selector mechanism (140) allows a user to select which graphical image to display. Selector mechanism (140) can be implemented mechanically. In some embodiments, selector mechanism (140) can further include a water proof control panel with a plurality of select switches (150). Selector mechanism (140) mounted to the outer surface area of display holder (2) and is operationally connected to the microprocessor (135) such that the user can select a particular graphic image (132). To prevent the inference of the magnetic field with the operation of the electronic device, display holder (2) can be encompassed in a non-magnetic alloy. Selector mechanism (140)

can also be activated via a remote control mechanism (260) shown in FIGS. 6A and 6B which is described below. In some embodiments, the selector mechanism (140) can be place upon the dash board of the vehicle and operationally connected to the microprocessor (135).

In operation, when a user selects a switch (150) from the selector mechanism (140) for a particular graphic image (150), a signal is sent to the software driver (131) which then retrieves the graphic image (132) from memory (130) and displays it onto the flat panel display (125) utilizing a conventional graphics card or other suitable means. The selected image is displayed until the software driver (131) is sent a signal to display an alternative graphics image. The selection of another image can be by the user or by default upon boot up of the software driver . . .

FIG. 4 illustrates an exploded view of an alternative embodiment for the electromechanical power source, gearbox assembly (82) and FIG. 8 illustrates a cross sectional view of gear box assembly 82. Gearbox assembly (82) further comprises a gear box housing (23) for supporting rack C (25), gear A (26) and gear B (27). As shown, mounted at opposing ends of the gear box housing (23) are cylindrical in shape conductive coils (18) with a hollow internal diameter dimensioned to receive magnets (22) which are operationally connected at opposing ends of shaft of rack C (25). Gear A (26) has a circular shape with small section of teeth protruding on opposing ends on its circumference. Gear B (27) has a circular shape with a section of teeth protruding half way across its circumference. Gear A (26) and Gear B (27) are rotationally mounted to rack C (25) such that the teeth of rack C (25) meshes with the teeth of gear A (26) and gear B (27).

In use, gearbox assembly (82) further comprises intermittent driving gear A (26) which rotates as the tire rotates in either the clockwise or the counter clockwise direction. As the last tooth E (36) of gear A (26) completes its mesh or connection with the teeth of rack C (25) and gear B (27). In the illustrated position shown, the leading tooth on gear A (26) is about to make contact with the first tooth of gear B (27), causing the adjacent teeth to rotate in the direction of kinetic energy. The motion of gear B (27) is linearly translated to rack C (25) causing rack C (25) to travel in the direction of kinetic energy. At this point, the teeth on-gear B (27) are not in contact with gear A (26). Gear B (27) is then driven by rack C (25) until tooth D (31) of gear A (26) meshes with gear B (27), the alternative driving of rack C (25) by gear A (26) and gear B (27) produces a uniform reciprocating motion of rack C (25) causing magnet (22) to reciprocate between conductive coils (18) producing electricity by the Faraday Effect. As shown within FIG. 4, gear box assemblies (81 and 82) are mounted within interior cavity behind display holder (2).

FIG. 4 illustrates an exploded view of an alternative electromechanical power source, gearbox assembly (81), and FIG. 7 illustrates a cross sectional view of gear box assembly 81. In use, gearbox assembly (81) further comprises intermittent driving gear A (28) which rotates as the tire rotates in either the clockwise or the counter clockwise direction Gearbox assembly (81) further comprises a gearbox housing (23) for supporting rack B (29) and gear A (28). Rack B (29) further comprises a parallel shaft member extending linearly across the gear box housing (23) with the teeth of rack B (29) protruding towards gear A (28). As shown, conductive coils (18) are mounted to gearbox housing (23). Conductive coils (18) are cylindrical in shape with a hollow internal diameter dimensioned to receive magnets (22) which are operationally connected to rack B (29). Gear A (28) has a circular shape with a section of teeth protruding across its circumference. Gear A (28) is rotationally mounted to rack B (29) such that the teeth of gear A (28) meshes between teeth of rack B (29).

Gearbox assembly (81) further comprises the intermittent driving gear A that (28) rotates as the tire rotates in either the clockwise or counter clockwise direction, and the teeth of gear A (28) mesh alternatively with either side of rack B (29). In the position shown, gear A (28) is rotating in the clockwise direction, tooth G (30) is coming out of mesh with tooth F (32) as tooth C (33) is mating with tooth D (34) forcing rack B (29) to travel in direction of kinetic energy. As the last tooth G (30) completes its mesh or contact with tooth E (35) of rack B (29), tooth C (33) of gear A (28) is ready to engage tooth H (37) of rack B (29). When this occurs, the direction of movement of rack B (29) is reversed and the rack will move in the opposite direction. At this point, the side of rack B (29) where tooth D (34) and E (35) are not in contact with gear A (28). The alternative driving of rack B (29) and gear A (28) produces a uniform reciprocating motion of rack B (29) causing magnets (22) to reciprocate between conductive coils (18) producing electricity by the Faraday Effect. As shown within FIG. 4, the gearbox assembly (82 and 81) can be mounted within wheel mount (12) behind display member (2) and fixed to the weighted plate (10).

What is claimed is:

1. A displaying image mechanism wheel assembly mountable onto a wheel of a vehicle, the displaying image mechanism wheel assembly comprising: at least one first magnet affixed to a wheel mount; the wheel mount affixed to the wheel for rotation therewith; a transparent or translucent protective cover affixed to the wheel mount forming a hermitically sealed interior cavity therein, a display holder mounted to the wheel mount behind the protective covering within the interior cavity; a first stationary means operationally coupled to the display holder wherein the display holder is rendered stationary; an aesthetically pleasing image displayed on the display holder; an annularly shape drag tube assembly having an interior conduit therein, the drag tube assembly being co-axially mounted to the wheel mount; a second stationary means operationally coupled to the drag tube assembly wherein the drag tube assembly is rendered stationary; at least one coil assembly strategically mounted within the interior cavity having an interior chamber therein with conductive coils encircling therearound, the interior chamber surrounding the drag tube assembly thereabout; the interior conduit of the drag tube assembly receives an annular shape cage member, the cage member receiving a plurality of radially space second magnets and ball bearings such that as the wheel rotates the magnetic polarity between the at least one first magnet and the second magnets forces the rotation of the cage member within the interior conduit generating an electric current within the conductive coils; an electronic circuitry component being operationally mounted to the display holder or the second stationary means, the electronic circuitry being electrically connected to the conductive coils for transmitting the electric current to at least one light source network, the at least one light source network for illuminating the display holder.

2. The assembly of claim 1 wherein the second stationary means further comprises a weighted member mounted to the drag tube assembly, the weighted member having sufficient weight to counter the rotation of the wheel rendering the drag tube assembly stationary.

3. The displaying image mechanism wheel assembly of claim 2 wherein the weighted member is made of a plastic or metal material.

4. The displaying image mechanism wheel assembly of claim 1 wherein the image is an aesthetically pleasing affixed logo, insignia, emblem, or hologram.

5. The displaying image mechanism wheel assembly of claim 1 wherein the first stationary means further comprises at least one second ball bearing and at least one third magnet affixed to a face of the display holder rendering the display holder stationary.

6. The displaying image mechanism wheel assembly of claim 1 wherein the at least one first magnet and the second magnets are at least 0.1 Tesla.

7. The displaying image mechanism wheel assembly of claim 1 wherein the drag tube assembly further comprises a protective cover made of non-magnetic material.

8. The displaying image mechanism wheel assembly of claim 1 wherein the conductive coil is a made of a material with a conductivity of greater than 1 siemens per meter.

9. The displaying image mechanism wheel assembly of claim 1 wherein the light source network further comprises a variable resistor coupled to a plurality of Light Emitting Diode (LED)s.

10. The displaying image mechanism wheel assembly of claim 2 further comprising: a segmented pin having a first section and a second section; the first section co-axially positioned between the drag tube assembly and the weighted plate member, the first section for supporting the connection of the first stationary means; and the second section co-axially positioned between the weighted plate member and the wheel mount, the second section for supporting the stationary connection of the weighted plate member to the wheel mount 11. The displaying image mechanism wheel assembly of claim 1 wherein the electronic circuitry component further comprises: a first switching relay, a second switching relay, and a third switching relay connected to the light source network; a first leg circuit for delivering the electric current to the light source network, the first leg circuit having the first switching relay, the second switching relay, a storage capacitor, the third switching relay connected in series; a second leg circuit for delivering the electric current to the light source network, the second leg circuit having the first switching relay, a charge circuit connected to a battery, the second switching relay, the storage capacitor, the third switching relay connected in series; and a means for alternatively switching between the first leg circuit and the second leg circuit based upon the voltage strength of the electric current within the first leg circuit and the second leg circuit.

12. The displaying image mechanism of claim 11 further comprising a means for rectifying the storage capacitor.

13. The displaying image mechanism of claim 11 wherein the storage capacitor is adapted to discharge the electrical current into the light source network with a predetermined time constant.

14. The displaying image mechanism of claim 11 further comprising a remote control circuit operationally coupled to the third relay, the remote control circuit for extinguishing the light source network.

15. The displaying image mechanism wheel assembly of claim 1 wherein the electronic circuitry component further comprises: a first switching relay, a second switching relay, and a third switching relay connected to the light source network; a first leg circuit for delivering the electric current to the light source network, the first leg circuit having the first switching relay, a first battery, the second switching relay, a storage capacitor, the third switching relay connected in series; a second leg circuit for delivering the electric current to the light source network, the second leg circuit having the first switching relay, a backup battery, the second switching relay, the storage capacitor, the third switching relay connected in series; a third leg circuit for delivering the electric current to the light source network, the third leg circuit having the first switching relay, the second switching relay, the storage capacitor, the third switching relay connected in series; and a means for alternatively switching between the first leg circuit, the second leg circuit, and the third leg circuit based upon the voltage strength of the electric current within the first leg circuit, the second leg circuit and the third leg circuit.

16. The displaying image mechanism wheel assembly of claim 1 wherein the display holder further comprises: a flat panel assembly operatively coupled to a microcontroller and a memory storage device; the memory device containing the image to be displayed upon the display holder; and a means for displaying the image onto the flat panel.

17. The displaying image mechanism wheel assembly of claim 16 wherein the means for displaying the image further comprises a selector mechanism adapted to select a particular graphic image from the memory device for display onto the flat panel.

18. The displaying image mechanism wheel assembly of claim 16 wherein the flat panel assembly is a liquid crystal display.

19. The displaying image mechanism wheel assembly of claim 1 wherein the protective cover is made of a convex or concave lens.

20. A displaying image mechanism wheel assembly countable onto a wheel of a vehicle, the displaying image mechanism wheel assembly comprising: a wheel mount, the wheel mount affixed to the wheel for rotation therewith; a transparent or translucent protective cover affixed to the wheel mount forming a hermitically sealed interior cavity therein; a display holder mounted to the wheel mount behind the protective cover, within the interior cavity; a gearbox housing having a second interior cavity therein; at least one linear rack member operationally mounted within the second interior cavity; the at least one linear rack member having a shaft member extending linearly outward therefrom and the shaft member extending outside of the gearbox housing with a magnet mounted thereto; at least one conductive coil surrounding the magnet thereabout; at least one gear member reciprocatively mounted to the linear rack member such that the magnet reciprocates in and out of the at least one conductive coil as the wheel rotates for generating an electric current; an electronic circuitry component mounted to the display holder or the gear box housing, the electronic circuitry component electrically connected to the at least one conductive coils; and at least one light source network for illuminating the display holder, the light source network being electrically connected to the electronic circuitry component.

21. The displaying image mechanism wheel assembly of claim 20 wherein the first magnet and the second magnet is greater than 0.1 Tesla.

22. The displaying image mechanism wheel assembly of claim 20 further comprising: protective cover encompassing the gearbox assembly thereabout hermitically sealing the gearbox assembly therein.

23. The displaying image mechanism wheel assembly of claim 22 wherein the protective cover is made of non-magnetic material.

* * * * *